Jan. 9, 1934.  Z. P. CANDEE  1,943,107
VERTICAL AUTOMATIC SHELL TRIMMING MACHINE
Filed June 11, 1931  4 Sheets-Sheet 1

INVENTOR
*Zenas P. Candee*
BY HIS ATTORNEY
*H. G. Manning*

Jan. 9, 1934. Z. P. CANDEE 1,943,107
VERTICAL AUTOMATIC SHELL TRIMMING MACHINE
Filed June 11, 1931 4 Sheets-Sheet 2
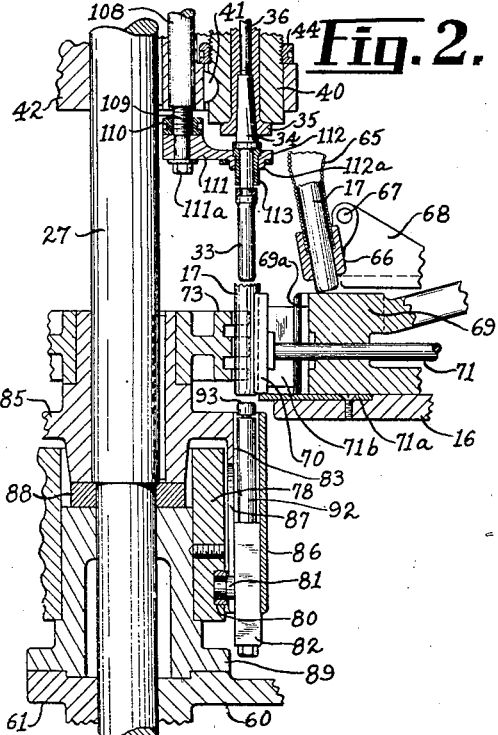
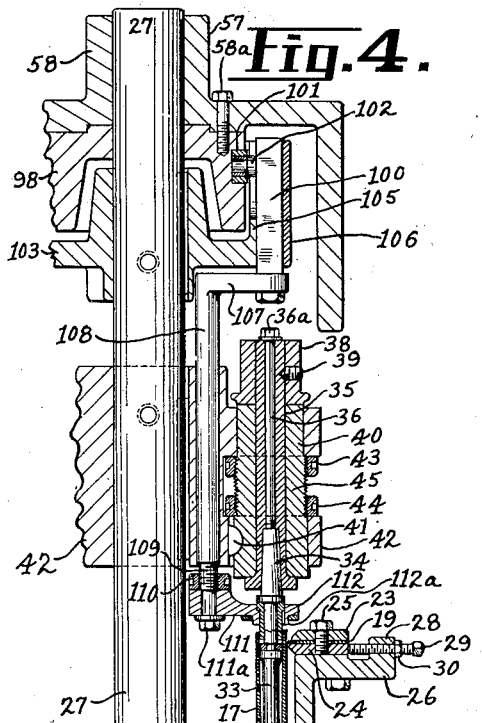
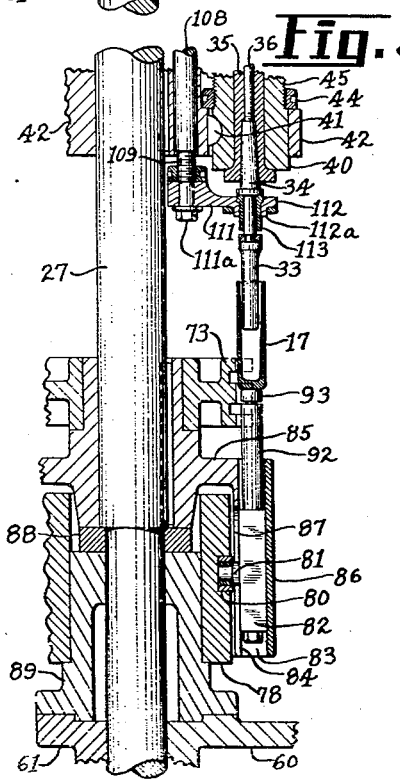
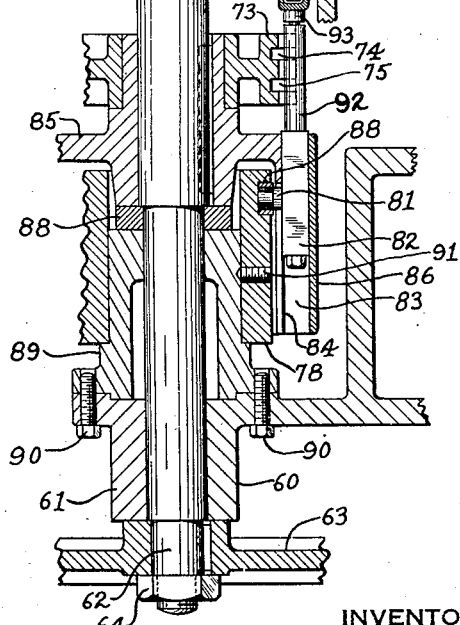
INVENTOR
Zenas P. Candee.
BY HIS ATTORNEY
H. G. Manning Jan. 9, 1934.                    Z. P. CANDEE                    1,943,107
VERTICAL AUTOMATIC SHELL TRIMMING MACHINE
Filed June 11, 1931                4 Sheets-Sheet 3

INVENTOR
Zenas P. Candee.
BY HIS ATTORNEY
H. G. Manning

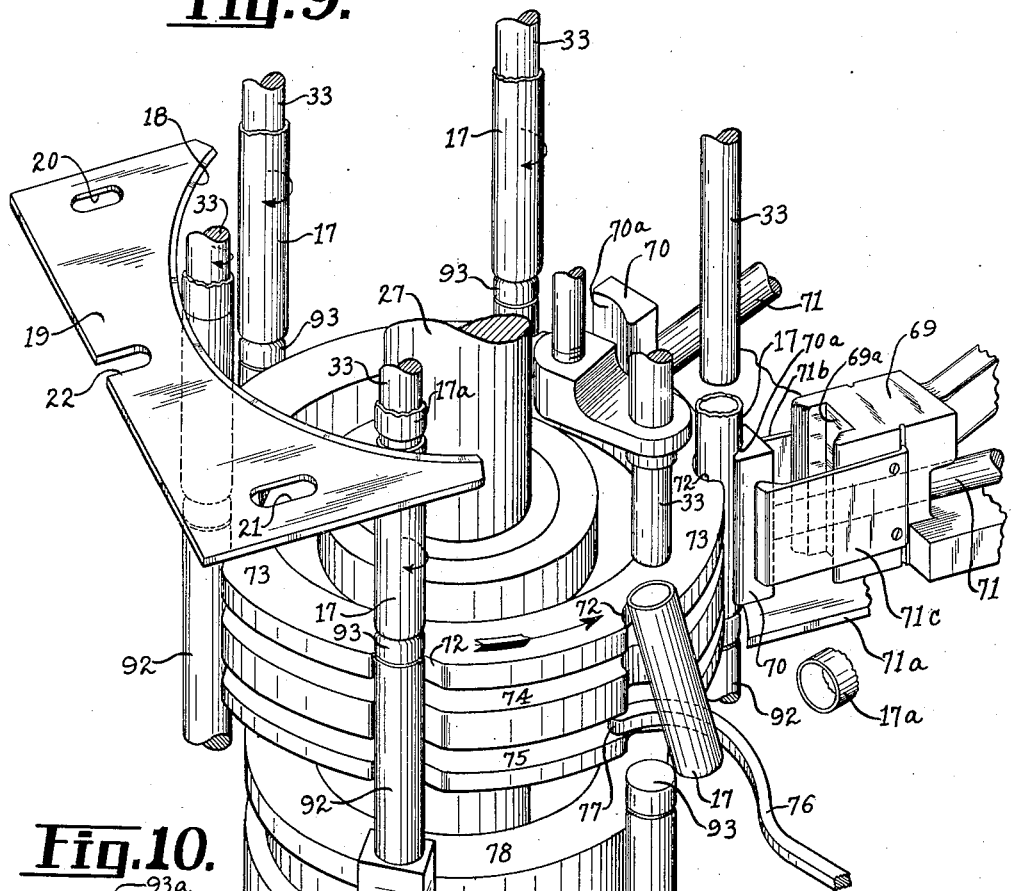
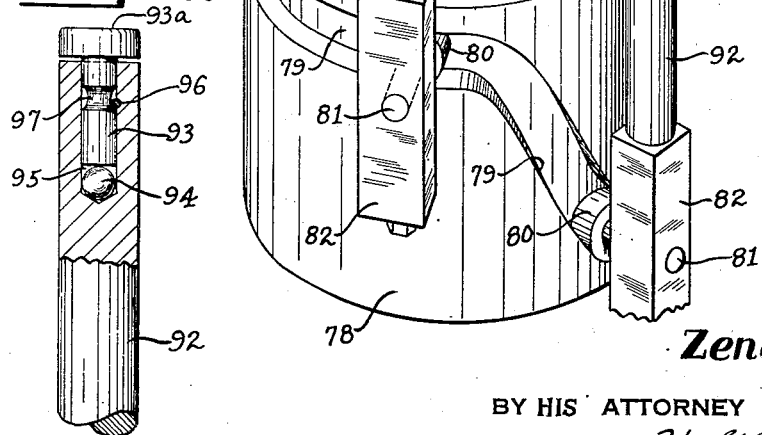

Patented Jan. 9, 1934

1,943,107

UNITED STATES PATENT OFFICE 1,943,107

VERTICAL AUTOMATIC SHELL-TRIMMING MACHINE

Zenas P. Candee, Watertown, Conn., assignor to The Waterbury Farrel Foundry & Machine Company, Waterbury, Conn., a corporation of Connecticut Application June 11, 1931. Serial No. 543,620

18 Claims. (Cl. 29—1.32)

This invention relates to shell edging or trimming machines, and more particularly to a machine for automatically removing the rough edge from a shell by moving said shell along the edge of a horizontal stationary cutter blade.

One object of this invention is to provide a machine of the above nature which will have a high rate of production and which will trim the shells and tubes very accurately.

A further object is to provide a machine of the above nature in which the vertical shell will be caused to rotate as it moves along the edge of the stationary cutter blade by the friction therewith or may be rotated by power.

A further object is to provide a machine of the above nature in which the speed of the working parts is relatively slow, thereby reducing the danger of breakage, increasing the accuracy and quality of the product, and minimizing the amount of wear of the parts.

A further object is to provide a machine of the above nature in which it will be unnecessary to provide means for lubricating and cooling the articles being worked on, and in which expensive anti-friction bearings are not required.

A further object is to provide a shell-trimming machine of the above nature in which there will be no lost motion between the shell and the cutter blade, and in which a plurality of shells may be trimmed simultaneously by the same blade.

A further object is to provide a machine of the above nature which will be relatively simple in construction, inexpensive to manufacture, easy to assemble and control, compact, and very efficient and durable in use.

With these and other objects in view, there has been illustrated on the accompanying drawings, one form in which the invention may be conveniently embodied in practice.

In the drawings:

Fig. 2 is a fragmentary sectional view of the same, showing one of the shells ready to be pushed upwardly upon the mandrel and showing another shell at the bottom of the flexible feed tube and resting upon the top of the feed block.

Fig. 3 is a fragmentary sectional view similar to Fig. 2, showing the shell as it appears when pushed half way upon the mandrel by the "push-on" mechanism.

Fig. 4 is a fragmentary sectional view of the entire length of the central main shaft and associated mechanism, and showing one of the shells after it has been pushed upon the mandrel and rotated into contact with the stationary cutter blade.

Fig. 9 is an isometric view showing the relative positions of the six shell-holding mandrels, the cutter blade, and the push-on rod operating cam.

Fig. 10 is an enlarged view, partly in section, of one of the push-on rods with its rotatable shell-supporting head.

Figure 1:
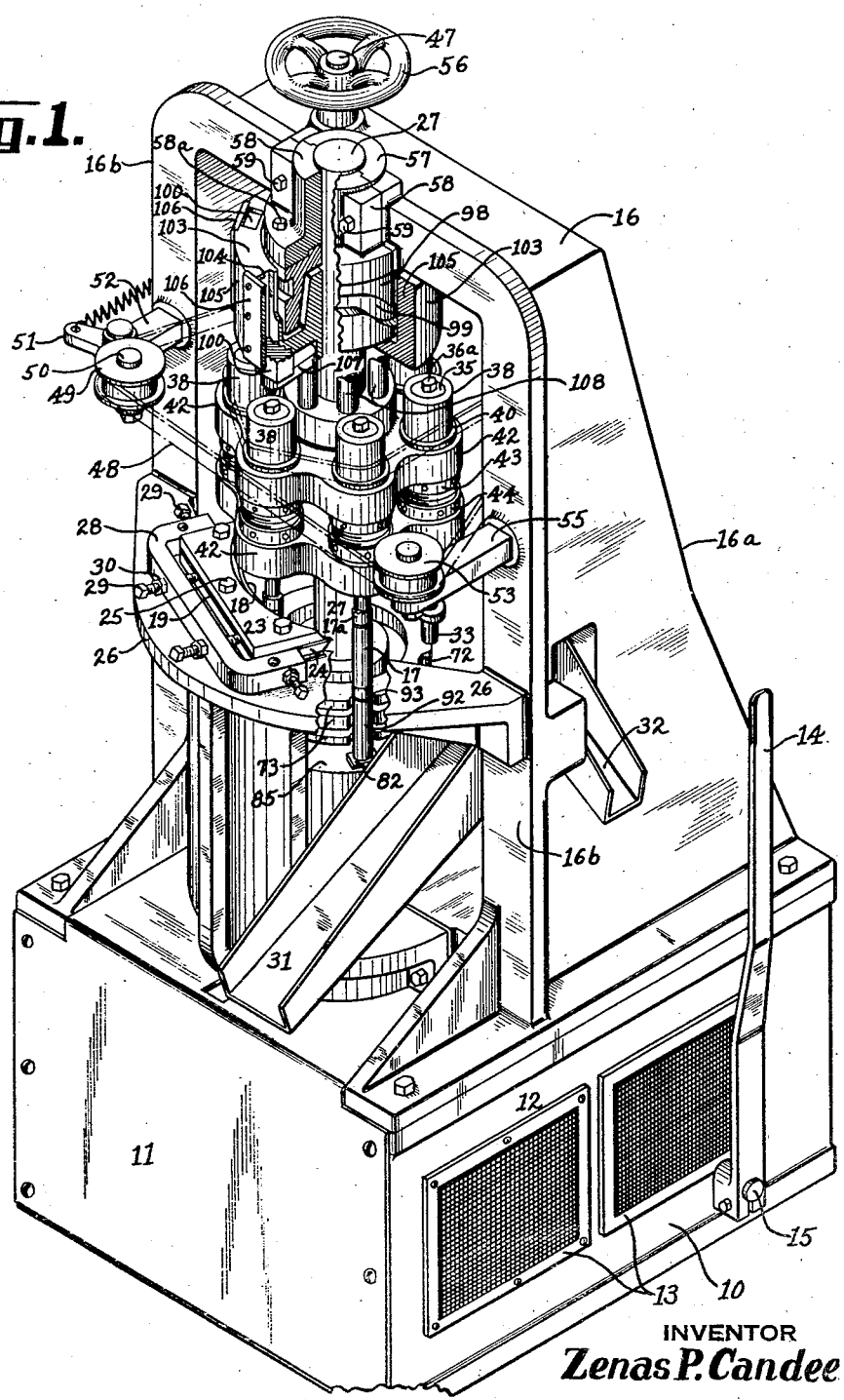
Fig. 1 represents an isometric view of the shell-trimming machine shown, partly in section and partly broken away, to illustrate a portion of the interior construction.
Figure 5:
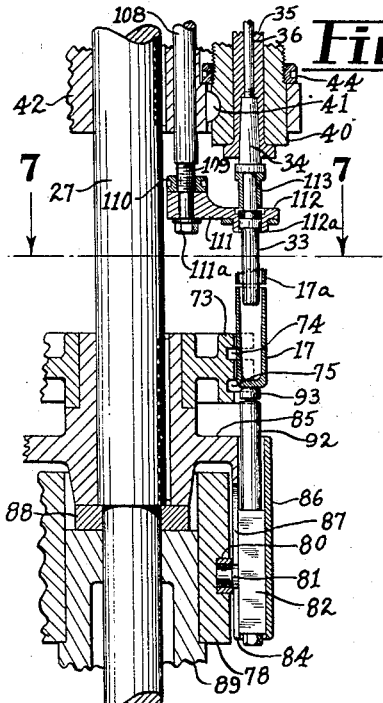
Fig. 5 is a fragmentary sectional view similar to Figs. 2 and 3 after the severed scrap and shell have been stripped from the mandrel.

Previous machines for trimming the rough edges from cartridge shells and other tubular articles were generally of the lathe or chuck type and were slow in operation, being capable of trimming only from seventy to eighty shells per minute, at the maximum. Moreover, the work-holding spindles of such former machines were often operated at the high speed of from 3000 to 3500 R. P. M., which resulted in the rapid wearing out of the working parts. Furthermore, only one shell could be trimmed at one time by the cutter mechanism of such machines, and the whole cycle of motions had to be completed on one shell before another shell could be fed through the machine.

By means of the present invention, the above and other disadvantages have been avoided, and a new type of machine has been produced which will readily trim over two hundred shells per minute without requiring the shell-holding spindles to rotate at a speed of greater than 180 R. P. M.

While the invention has been herein disclosed for use in trimming the edge of a cartridge shell, it will be understood that it may also be employed on other types of shells, and on various other tubular articles, within the general scope of the invention.

Referring now to the drawings in which like reference numerals denote corresponding parts throughout the several views, the numeral 10 indicates the base or pedestal of the machine having a front cover plate 11 and side walls 12, each of which has a pair of open screens 13 for permitting the circulation of air into the interior of said base 10.

In order to control the starting and stopping of the machine, provision is made of a vertical handle 14 rigidly secured at its lower end upon a horizontal clutch-operating shaft 15.

The upper part of the machine is carried and partially covered by a main supporting frame 16, open at the front and rear and having tapered side walls 16a and a vertical front flange 16b, as clearly shown in Fig. 1.

Cutter mechanism

The shells 17 to be trimmed are adapted to be successively carried around in a circular path against the curved concave sharpened edge 18 of a cutter blade 19 having a substantially rectangular outside edge, as clearly shown in Fig. 9. The cutter blade 19 is provided with a pair of transverse elongated openings 20 and 21 adjacent its ends, and an open slot 22 in its rear edge. By means of this construction, the cutter blade 19 may be readily adjusted within a pair of upper and lower holder plates 23 and 24. A plurality of clamping screws 25, three in this instance, are provided for holding the cutter blade 19 in the desired adjusted position between the holder plates 23 and 24. The assembled cutter blade 19 and holder plates 23 and 24 are adapted to rest as a unit upon a convex arched cutter-support bracket 26 extending forwardly from the main support frame 16.

In order to permit the cutter blade 19 to be adjusted in the desired eccentric position with respect to the axis of the main shaft 27 around which the shell-carrying mandrels 33 are adapted to rotate, provision is made of an upstanding U-shaped boss 28 formed integral with the bracket 26, and carrying a plurality of adjustable horizontal set screws and nuts 29 and 30 respectively. Two sets of said nuts and screws are located in front of said cutter blade 19, while one set of said nuts and screws is located at each end of the cutter blade, as clearly shown in Fig. 1.

The stationary cutter blade 19 is adapted to be held downwardly upon the bracket 26 at all times by means of a clamping member 30a having its extremities lying in flat contact with the upper holder plate 23, said clamping member having an upwardly offset arched central section 30b located above the central clamping screw 25.

Shell-carrying mechanism

For the purpose of carrying the shells 17 around the axis of the main shaft 27 successively into frictional engagement by the cutter blade 19, provision is made of a plurality of equally spaced mandrels 33, six in this instance. The mandrels 33 are detachably secured to and are adapted to depend from the lower ends of a like number of tapped cones 34, each of which is adapted to be tightly driven into a hollow spindle 35. The cones 34 are held in position within the spindles 35 by bolts 36 screwed into said cones 34, said bolts having heads 36a engaging the tops of said spindles.

When the machine is operating upon shells having thin walls, the shells will be automatically rotated by their frictional engagement with the cutter blade 19. When, however, shells of heavy gauge stock are being trimmed, they will preferably be rotated by a positive driving force imparted to pulleys 38 secured to the upper parts of said spindles 35 as by set screws 39. The spindles 35 are journaled within vertical sleeves 40, rigidly connected as by a "Woodruff key" 41 to a horizontal spindle-carrying dial 42 having a "scalloped" outer periphery as clearly shown in Fig. 1. Each spindle 35 is held at the desired height by means of a pair of capstan nuts 43 and 44, screwed upon a threaded central section 45 of said sleeve 40.

Positive shell-rotating mechanism

Figure 7:
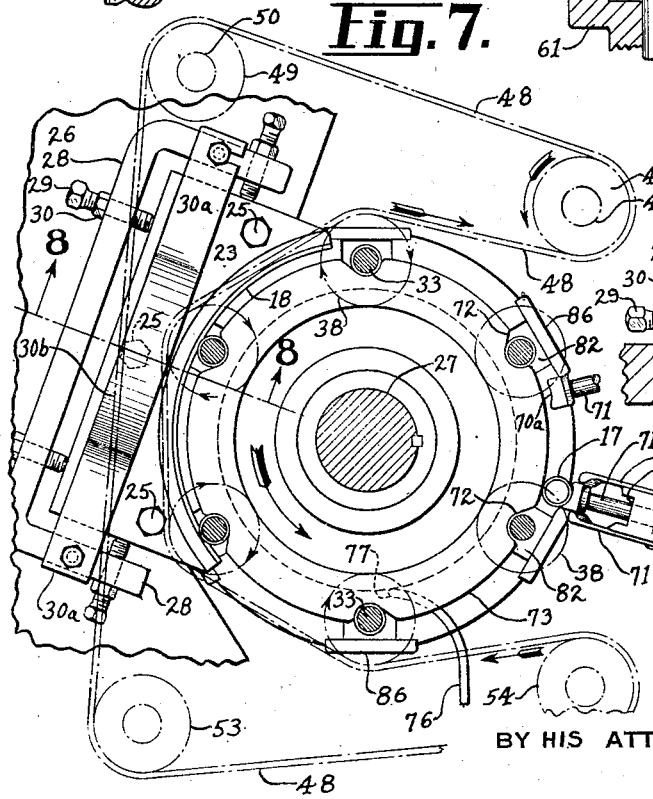
Fig. 7 is a sectional plan view, taken along the line 7—7 of Fig. 5, looking downwardly, and showing the relative positions of the cutter blade and the six traveling shell-holding mandrels, the driving belt and the spindle-operating pulleys being shown in phantom.
Figure 8:
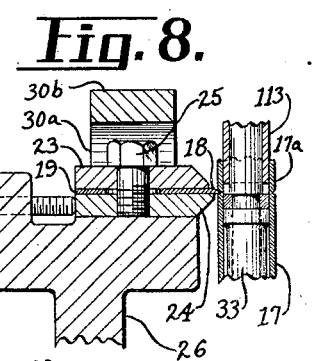
Fig. 8 is a vertical sectional view, on a somewhat enlarged scale, of the cutter blade and one of the shells being trimmed thereby, the section being taken along the line 8—8 of Fig 7, looking in the direction of the arrows.

The spindle pulleys 38, when at the forward cutting position, may, if desired, be positively driven by a belt 48 receiving power from a pulley 46 mounted on a drive shaft 47 mounted within the main support frame 16. The direction of movement of the belt 46 is shown by the arrow in Fig. 7, and it will be understood that all of the pulleys 38 will be rotated in a clockwise direction by the belt 48 so long as they remain at the front of the machine during their travel around the main shaft 27. The belt 48 is held taut at all times by means of a tension pulley 49 mounted on a stud 50 carried by a spring-tensioned lever 51, said lever being pivoted on a bracket 52 rigidly carried on the front part of the main support frame 16. After leaving the tension pulley 49, the belt 48 is adapted to pass across the front of the machine and around a pair of stationary idle pulleys 53 and 54 mounted on a pair of brackets 55 secured to the support frame 16.

In order to facilitate the adjustment of the machine to any desired point in the cycle of operation, the spindle drive shaft 47 is provided at its upper end with a hand wheel 56, as clearly shown in Fig. 1.

The main shaft 27 of the machine is adapted to be journaled at its upper end between a semi-circular bearing boss 57 integral with the support frame 16 and to a semi-circular front bearing cap 58 attached to said boss 57 as by bolts 59. The lower end of the bearing shaft 27 is similarly journaled between a semi-circular boss 60 on the support frame 16 and a semi-circular cap member 61 secured thereto.

As shown in Fig. 4, the bottom of the main shaft 27 is reduced at 62 and has a drive gear 63 keyed thereto, said gear 63 being held in place by a nut 64 screwed on said reduced end 62. The drive gear 63 and the spindle drive shaft 47 are adapted to receive power preferably from the same source, such as an electric motor, not shown, by suitable gearing, not shown. Under ordinary conditions the main shaft 27 of the machine will be driven at the rate of about 25 R. P. M., while the spindle drive shaft 47 will be driven at a speed of about 180 R. P. M. This latter speed corresponds approximately to the speed at which the shells would rotate by the frictional contact with the cutter blade 19, if no positive drive were employed.

Shell feed mechanism

The shells 17 are adapted to be fed to the traveling mandrels 33 in succession from a single hopper, not shown, by means of a pair of depending flexible feed tubes 65, each of which is supported by a pivoted holder member 66 which is adapted to swing on a pivot pin 67 secured to a fixed bracket 68, as shown in Fig. 2. After passing down through the holder member 66, the shell 17 is adapted to rest upon the upper flat surface of a substantially rectangular reciprocating feed block 69 secured at its rear end to a cam-operated arm, not shown. Fitting into a vertical recess 69a on the front face of the feed block 69 is a vertical feed finger 70 having a curved front face 70a to conform with the surface of the shell 17 and secured at its rear end to a push-in rod 71 passing through the block 69 and adapted to be reciprocated by means of a rocker arm, not shown.

When the reciprocating block 69 is in its rearmost position, the shell 17 will drop down upon a wear plate 71a suitably attached to the frame 16. The shell 17 is held from falling over by means of a pair of resilient spring fingers 71b and 71c connected at their rear ends to the side walls of the feed block 69. The two feeding units just described are adapted to be reciprocated alternately in synchronism with other parts of the machine for alternately advancing the shells 17 into the recesses 72 formed in the periphery of a work-carrying dial 73.

As will be understood, each feed block 69 and feed finger 70 is adapted to intermittently slide rearwardly to permit a shell 17 to drop down upon the wear plate 71a, and said shell will thereafter be forced forwardly by the feed finger 70 into one of the recesses 72, and then pushed up into cutting position upon the mandrel 33 by the push-on mechanism to be hereinafter described.

Push-on mechanism

The mechanism for raising the shells 17 upon each mandrel 33 comprises a single cylindrical stationary cam 78. The cam 78 has a curved roll groove 79 for guiding the rollers 80, each of which is carried on a stud 81 extending inwardly from a vertical slide 82, preferably square in cross-section. Each slide 82 is adapted to be guided in its up and down movements by means of a vertical guide groove 83 formed in a skirt member 84 depending from a flat disc member 85 keyed or otherwise secured to the main shaft 27. The push-on slide 82 is adapted to be held within the vertical groove 83 by a cover plate 86 secured to said skirt as by a suitable screw, not shown.

The neck of the roller stud 81 is adapted to be slid up and down within a vertical clearance slot 87 formed in the interior of the skirt 84. A spacing disc 88 is located between the disc member 85 and a cam-holding member 89 attached to the bottom journal members 60 and 61 of the main shaft 27, as by bolts 90. The cam 78 is secured to the bearing member 89 as by a set screw 91.

In order to support the bottom of the shells 17 and facilitate the revolution thereof on the mandrel 33 during its circular travel around the main shaft 27, the push-on slide 82 is provided with a circular upper push-on rod 92 having an anti-friction pin 93 on its upper end.

The anti-friction pin 93 has an enlarged head 93a upon which the lower end of the shell 17 is adapted to rest, the shank of said pin 93 being supported by a ball bearing 94 seated in a recess 95 formed in the upper circular part of said push-on slide 92. The anti-friction pin 93 is prevented from moving out of its recess 95 by means of a transverse lock pin 96 located within an annular groove 97 formed at an intermediate point on the shank of said pin 93.

Stripper mechanism

In order to strip the shell 17 from the mandrel 33 after the trimming operation has been completed, provision is made of a single cylindrical stationary stripper cam 98 secured to the bearing boss 57 and bearing cap 58, as by bolts 58a and having an exterior cam groove 99 for guiding the up and down motion of six stripper slides 100 located above the spindles 28. Each stripper slide 100 carries a roller 101 on a stud 102, said roller being guided by said cam groove 99.

Located beneath the stripper cam 98 and telescoping therewith is a stripper dial member 103 keyed to the main shaft 27 and having a plurality of vertical guide slots 104 located in an upwardly extending flange 105, said slots serving to hold the stripper slides 100 in proper operating position. Cover plates 106, similar to the plates 86, are secured to the flange 105 outside of the slots 104.

Attached to the lower end of each stripper slide 100 is an angle bar 107 having a depending shank 108 mounted to slide up and down within a recess formed in the spindle-carrying dial 42. The lower end of the shank 108 is reduced and threaded at 109 for receiving a capstan adjusting nut 110. Below the threaded section 109, the shank 108 is still further reduced in section and has an apertured stripper arm 111 rigidly secured thereon as by a bolt 111a, said arm 111 carrying an outwardly extending stripper ring 112 integral with said arm 111 for encircling the flanged sleeve 113 on the upper part of the mandrel 33. Each of the rings 112 has a short depending skirt 112a which is adapted to engage the top of the cut-off scrap ring 17a and force it and the shell 17 off the mandrel 33 at the conclusion of the trimming operation.

Ejecting mechanism

The work carrier dial 73 is provided with a pair of vertically-spaced annular grooves 74 and 75 for receiving a pair of stationary ejector fingers 76, the inner extremities 77 of which are adapted to project behind the advancing shells 17, as they travel around the main shaft 27 after the trimming operation has been completed. In the present embodiment of the invention, only one of the ejector fingers 76 has been illustrated.

After the shell 17 has been trimmed and ejected, it is adapted to be carried downwardly out of the front of the machine into a suitable receptacle, not shown, by means of a downwardly inclined chute 31. The ring 17a of scrap metal cut from the top of the shell will at the same time be blown by an air nozzle, not shown, into a downwardly inclined chute 32 extending out through the side of the main support frame 16 and delivering said scrap ring 17a into another receptacle, not shown.

Operation

In operation, the untrimmed shells 17 are fed downwardly with their open ends up from a common hopper, not shown, through the pair of flexible feed tubes 65, from which they will pass into the feed holders 66. The tubes will then rest upon the tops of the feed blocks 69 in the position shown in Fig. 2. They will remain in this position until the feed blocks 69 are retracted, whereupon the shells 17 will drop downwardly upon the support frame 16 and be resiliently pressed outwardly against the periphery of the work-carrying dial 73. The recesses 72 of said dial 73 are adapted to alternately come into alinement with the feed blocks 69, causing the shells 17 to be alternately snapped into said recesses.

By means of this construction, the shells may be fed into the machine at double the speed which would otherwise be the case. As the dial 73 slowly rotates with the main drive 27, the push-on cam 78 will raise the slides 82 upwardly in succession. The shells will thus be tightly pressed upon the flared upper ends of the mandrels 33. Further rotation of the main shaft 27 and work carrier dial 73 will cause the shells 17 to roll along the eccentrically mounted concave edge 18 of the cutter blade 19.

The depth of cut increases gradually throughout the travel of the shell along the cutter blade 19, so that all portions of said blade will receive substantially the same wear. The top rough edges of the shells 17 will thus be automatically removed, forming rings 17a of scrap.

Figure 6:
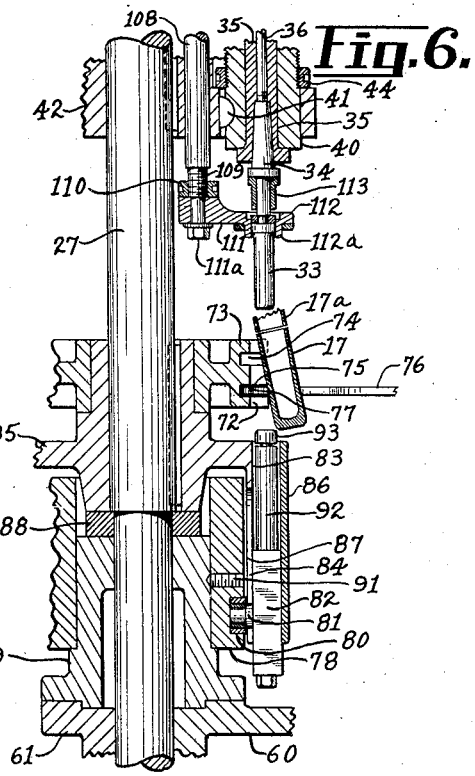
Fig. 6 is a fragmentary sectional view showing the appearance of the shell and scrap as they are being ejected from the machine.

After the mandrels 33 have carried the shells beyond the cutter blade 19, the push-on rods 92 will be lowered and the stripper mechanism will then come into action causing the stripper ring 112 to force the shell 17 and scrap ring 17a downwardly off of the mandrel 33. The shell 17 will be then ejected by the ejector finger 76, as shown in Figs. 6 and 9, and will be carried out of the front of the machine through a chute 31 into the receptacle located below. At the same time the scrap ring 17a will be blown out through the side of the machine by the jet of compressed air and will drop through the scrap chute 32 into the second receptacle.

The above described cycle of operation will be continued as long as the machine is running, and it will be understood that the work carrying dial 73 will rotate continuously in one direction alternately receiving the shells to be trimmed from the two flexible magazine feed tubes 65. It will also be understood that the shells will be pressed against the periphery of the dial 73 and will snap suddenly into the recesses 72 when the latter come into alinement with the feed blocks 69.

One advantage of the present invention is that due to the low working speeds of the machine it is unnecessary to make the parts of expensive materials; thus, for example, the stationary cutter blade may be constructed from cheap hardened steel which need not be ground to such a high degree of accuracy as was required with the former rotary types of cutters.

While there has been disclosed in this specification one form in which the invention may be embodied, it is to be understood that this form is shown for the purpose of illustration only, and that the invention is not to be limited to the specific disclosure but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In a shell-trimming machine, a base, a rotary main shaft, a spindle-carrying dial rigidly secured to said main shaft and rotatable in an arc therewith, a shell-carrying rotary mandrel supported by said spindle, a stationary elongated arcuate cutter blade located in the arcuate path of said shell for cutting off the end thereof as it passes along the length of said blade, and means to rotate said main shaft.

2. In a shell-trimming machine, a base, a rotary main shaft, a shell-carrying rotary mandrel supported by said main shaft and rotatable therewith, a stationary elongated horizontal arcuate cutter blade located in the arcuate path of said shell for cutting off the end thereof as it passes along the length of said blade, and means for driving said main shaft to cause said shell to travel by said cutter blade.

3. In a shell-trimming machine, a base, a rotary main shaft, a shell-carrying rotary mandrel supported by said main shaft and rotatable in an arc therewith, a stationary elongated curved cutter blade located in the arcuate path of said shell for cutting off the end thereof as it passes along the length of said blade, and means for driving said main shaft to cause said shell to travel by said cutter blade.

4. In a shell-trimming machine, a base, a rotary main shaft, a shell-carrying rotary mandrel supported by said main shaft and in an arc rotatable therewith, a stationary elongated concave cutter blade for cutting off the end, thereof as it passes along the length of said blade located in the arcuate path of said shell, and means for driving said main shaft to cause said shell to travel by said cutter blade.

5. In a shell-trimming machine, a base, a rotary main shaft, a shell-carrying rotary mandrel supported by said main shaft and rotatable in an arc therewith, a stationary elongated curved cutter blade located in the arcuate path of said shell, and means for driving said main shaft to cause said shell to travel along the length of said cutter blade, said cutter blade being mounted eccentric to said main shaft to cause the depth of cut to gradually increase as the shell travels over the edge of said cutter blade.

6. In a shell-trimming machine, a base, a stationary cutter blade, and means to move a shell along the edge of said blade for a substantial portion of its length for trimming off the rough edge of said shell, the friction between said shell and said cutter blade causing said shell to rotate as it passes along the edge of said blade.

7. In a shell-trimming machine, a base, a horizontal stationary cutter blade, and means to move a vertical shell against the edge and along the length of said blade for trimming off the rough edge of said shell, the friction between said shell and said cutter blade causing said shell to rotate as it passes along the edge of said blade.

8. In a blank-trimming machine, a base, a stationary elongated cutter blade, and means to move a blank against the edge and along a substantial portion of the length of said blade for trimming off the rough edge of said blank, the friction between said blank and said cutter blade causing said blank to rotate as it passes along the edge of said blade.

9. In a shell-trimming machine, a base, a rotary main shaft, a plurality of shell-carrying rotary mandrels supported around said main shaft and rotatable in an arc therewith, a stationary elongated cutter blade having a curved cutting edge located in the arcuate path of said shells, and means for rotating said main shaft to cause said shells to successively travel by and in contact with said cutter blade and be trimmed thereby.

10. In a shell-trimming machine, a base, a vertical main shaft, a shell-carrying rotary mandrel supported by said main shaft, a stationary elongated cutter blade having a cutting edge located in the path of said shell, means to push said shell upon said mandrel and support it during its travel around said main shaft, means to strip said shell from said mandrel after trimming, and means to thereafter eject said shell from the machine.

11. In a shell-trimming machine, a base, a rotary main shaft, a plurality of shell-carrying rotary mandrels supported around said main shaft and rotatable in an arc therewith, a stationary elongated cutter blade having a curved cutting edge located in the arcuate path of said shells, means for rotating said main shaft to cause said shells to successively travel by and in cutting contact with said cutter blade and be trimmed thereby, and cam-operated means for feeding said shells upon said mandrels.

12. In a shell-trimming machine, a base, a rotary main shaft, a shell-carrying inverted rotary mandrel supported by said main shaft and rotatable in an arc therewith, a stationary elongated cutter blade located in the arcuate path of said shell, and means for driving said main shaft to cause said shell to travel by and in cutting contact with said cutter blade.

13. In a shell-trimming machine, a base, a rotary main shaft, a plurality of shell-carrying rotary mandrels supported around said main shaft and rotatable in an arc therewith, a stationary elongated cutter blade having a curved cutting edge located in the arcuate path of said shells, means for rotating said main shaft to cause said shells to successively travel by said cutter blade into contact therewith and be trimmed thereby, and cam-operated means for stripping said shells from said mandrels after the trimming operation.

14. In a shell-trimming machine, a base, a rotary main shaft, a shell-carrying rotary mandrel supported by said main shaft and rotatable in an arc therewith, a stationary elongated cutter blade located in the arcuate path of said shell, means for driving said main shaft to cause said shell to travel by said cutter blade, and means for positively rotating said mandrel while the shell is in contact with said cutter blade.

15. In a shell-trimming machine, a base, a rotary main shaft, a shell-carrying inverted rotary mandrel supported by said main shaft and rotatable in an arc therewith, a stationary elongated arcuate cutter blade located in the path of said shell, means for driving said main shaft to cause said shell to travel by and in cutting contact with said cutter blade, and rotary anti-friction means for supporting said shell while it is rotating with said mandrel.

16. In a blank-trimming machine, a base, a stationary, elongated, adjustable cutter blade, and means to move a blank against a substantial portion of the length of said blade for trimming off the rough edge of said blank, the friction between said blank and said cutter blade causing said blank to rotate as it passes along the edge of said blade.

17. In a shell-trimming machine, a base, a rotary main shaft, a shell-carrying rotary mandrel supported by said main shaft and rotatable therewith in an arc about the axis thereof, a stationary elongated cutter blade extending along the arcuate path of said shell for engaging and trimming said shell as it passes along the length of said blade, and means for driving said main shaft to cause said shell to travel along the edge of said cutter blade in cutting engagement therewith.

18. In a blank trimming machine, a base, an elongated cutter blade supported by said base, a carrier for a plurality of tubular blanks for causing said blanks to be rolled along the edge of said blade to trim off the rough edges of said blanks, a pair of blank feeding tubes, and means for transferring blanks alternately from said tubes to alternate stations in said carrier, whereby the speed of said carrier may be increased.

ZENAS P. CANDEE.